(12) United States Patent
Ruholl et al.

(10) Patent No.: US 9,966,747 B1
(45) Date of Patent: May 8, 2018

(54) UNIVERSAL SURFACE FLUSH JUNCTION BOX

(71) Applicants: Dominic R. Ruholl, Shelbyville, IL (US); Robert S. Olson, Charleston, IL (US); Mark T. O'Dell, Charleston, IL (US)

(72) Inventors: Dominic R. Ruholl, Shelbyville, IL (US); Robert S. Olson, Charleston, IL (US); Mark T. O'Dell, Charleston, IL (US)

( * ) Notice: Subject to any disclaimer, the term of this patent is extended or adjusted under 35 U.S.C. 154(b) by 0 days. days.

(21) Appl. No.: 15/600,723

(22) Filed: May 20, 2017

(51) Int. Cl.
*H02G 3/12* (2006.01)
*H02G 3/08* (2006.01)

(52) U.S. Cl.
CPC ............ *H02G 3/126* (2013.01); *H02G 3/085* (2013.01)

(58) Field of Classification Search
CPC .............................. H02G 3/085; H02G 3/126
USPC ............................................ 174/50, 58, 502
See application file for complete search history.

(56) References Cited

U.S. PATENT DOCUMENTS

| | | |
|---|---|---|
| 2,697,535 A | 6/1951 | Olson |
| 3,701,448 A | 4/1971 | Vadnais |
| 3,724,795 A | 4/1973 | Callanan |
| 4,265,365 A * | 5/1981 | Boteler ................... H02G 3/088 174/53 |
| 5,448,012 A | 9/1995 | Jacob |
| 6,800,806 B1 | 10/2004 | Grday |
| 6,818,823 B2 * | 11/2004 | Barnes .................... H01F 27/06 174/50 |
| 6,881,900 B2 * | 4/2005 | Halbert .................... H02G 3/20 174/135 |
| 6,914,187 B2 * | 7/2005 | Hull ....................... H02G 3/125 174/135 |
| 6,979,779 B2 | 12/2005 | Grady |
| 7,022,912 B1 | 4/2006 | Kilburn |
| 7,165,366 B2 | 1/2007 | Anliker |
| 7,476,807 B1 * | 1/2009 | Gretz ...................... H02G 3/123 174/135 |
| 7,544,032 B1 | 6/2009 | Scott, Jr. |
| 8,084,687 B1 * | 12/2011 | Thurman ............... H02G 3/125 174/480 |
| 8,193,444 B2 * | 6/2012 | Rodenberg ............ H02G 3/126 174/50 |
| 8,633,384 B1 | 1/2014 | Shotey et al. |
| 2009/0183891 A1 | 1/2009 | Kramer, Jr. |

* cited by examiner

*Primary Examiner* — Dhirubahai R Patel
(74) *Attorney, Agent, or Firm* — Craig & Craig, LLC; John F. Watson; R. Sean Hocking

(57) ABSTRACT

A universal surface flush junction box which provides an improved way to transition from in-wall wiring to surface (out of wall) wiring in a building, which requires no additional mounting brackets or conduit bends, which thereby allows for a one trip complete rough-in installation and greatly reduces the amount of sealant required for smoke, fire and acoustical seal.

7 Claims, 9 Drawing Sheets

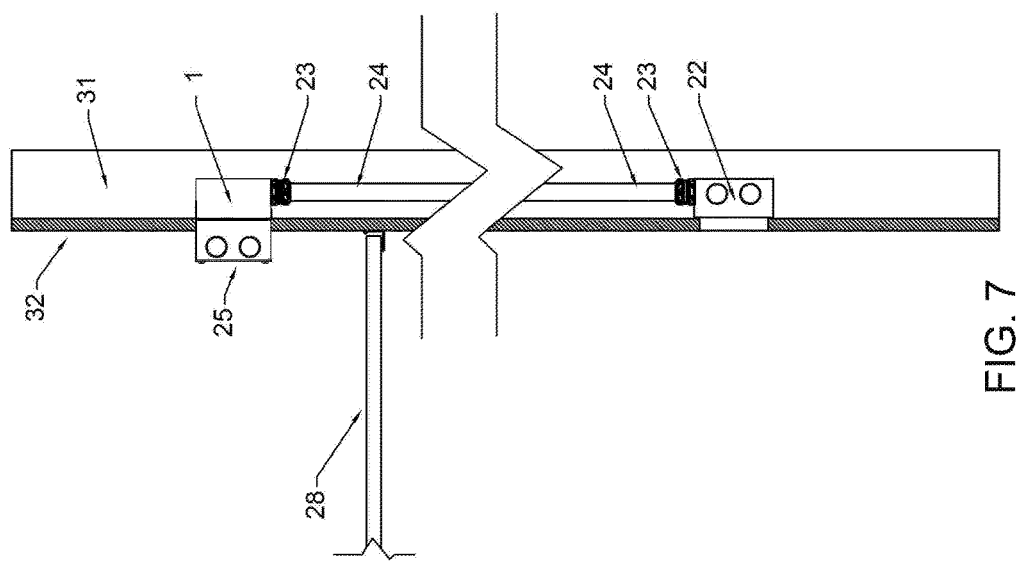

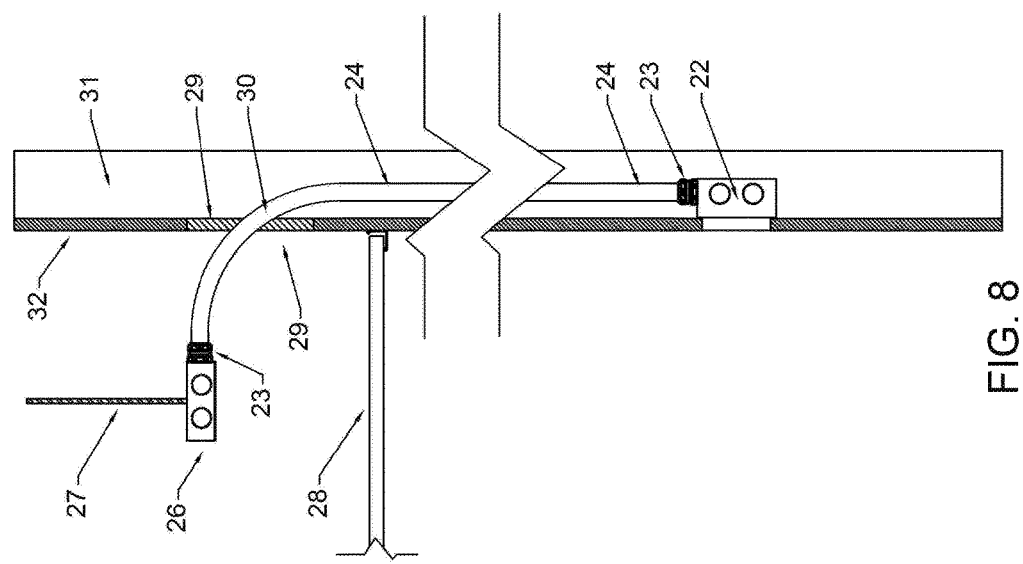

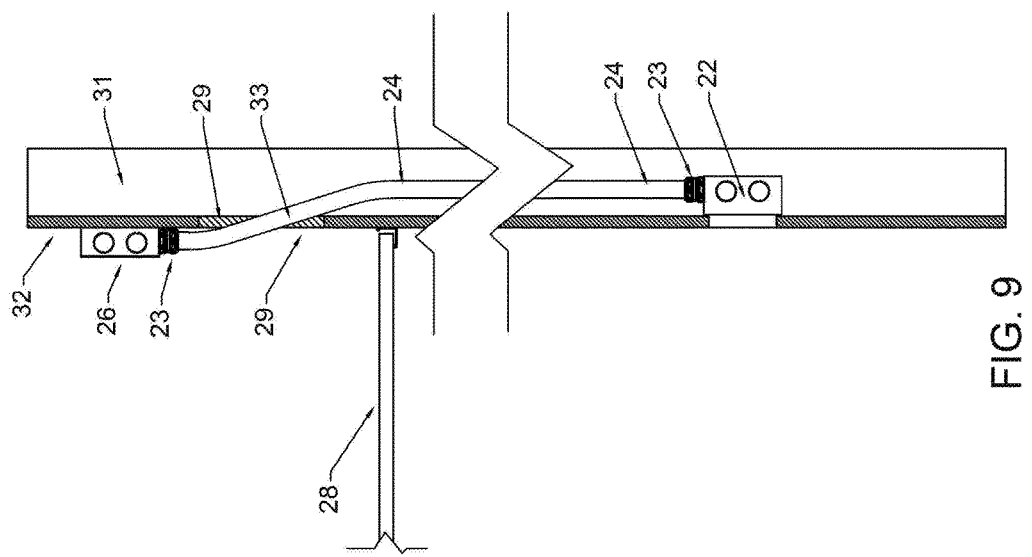

UNIVERSAL SURFACE FLUSH JUNCTION BOX

CROSS REFERENCE TO RELATED APPLICATIONS

Not Applicable.

FEDERALLY SPONSORED RESEARCH AND DEVELOPMENT

Not Applicable.

PARTIES TO A JOINT RESEARCH AGREEMENT

Not Applicable.

REFERENCE TO MICROFICHE APPENDIX CONTAINING

Not Applicable.

COMPUTER PROGRAM

Not Applicable.

BACKGROUND OF THE INVENTION

The disclosed invention relates to an electrical conduit junction box. In particular, the disclosed invention relates to an electrical conduit junction box that is useful in applications for connecting electrical conduit by facilitating a novel and improved method to transition from in-wall wiring to surface (out of wall) wiring in residential, commercial and industrial building applications. Wiring in such a building is typically installed in conduit located within the walls that exits the wall above the suspended ceiling for connection to other conduits in the electrical distribution system. Traditional electrical conduit junction boxes require the bending of an elbow or offset to the connecting conduit when there is a transition from in-wall wiring to surface wiring in a building. The elbow bend or offset is necessitated because, with a traditional electrical conduit junction box, one box is installed on one side of the wall and the other box is installed on the opposing side of the wall, necessitating the conduit to be bent to travel between the inner side of the wall and the outer side of the wall.

The use of a traditional electrical conduit junction box in applications for a transition from in-wall to surface wiring is labor intensive for both the electrician and the wallboard installer. In such applications, the electrician must bend conduit and then install the junction box and supporting hardware. The wallboard installer must cut a slotted opening for the conduit to exit through the wallboard and then fit the wallboard around the protruding conduit. The disclosed invention eliminates the need for bending of conduit and allows for simplified wallboard installation using a rotary cutter to cut the opening for the electrical conduit junction box.

When using a traditional electrical conduit junction box in transitioning from in-wall to surface wiring, traditional installations are usually performed in one of two ways. In the first traditional installation, conduit is installed from an in-wall device box with a 90 degree bend in the conduit required to exit the wall cavity to connect to a junction box independently supported from the structure (as seen in FIG. 8) per the National Electric Code section 314.23, which requires an enclosure mounted on a building or other surface to be rigidly and securely fastened in place. Performing such an installation with a traditional electrical conduit junction box requires a large opening to be cut into the wallboard that will likely require sealing for fire, smoke or acoustical reasons. Such an installation requires multiple return trips for various distinct contractors, such as electrical contractors, drywall contractors and carpenters, to complete the installation.

In the second traditional installation, conduit is installed from an in-wall device box with an offset bend in the conduit required to exit the wall cavity to connect to a junction box mounted to the wallboard (as seen in FIG. 9). Performing such an installation with a traditional electrical conduit junction box requires a large opening to be cut into the wallboard that will likely require sealing for fire, smoke or acoustical reasons. The surface box cannot be installed until after the wallboard installation. Such an installation requires multiple return trips for various contractors to complete the installation.

What is novel about the disclosed invention is that it's design enables an installation of the disclosed invention which requires no additional mounting brackets or conduit bends as required by the prior art. The disclosed invention is a novel design in which the junction box is installed within and passes thru a wall or wallboard, where said wall or wallboard might be constructed of drywall, dryvit or stucco, wood paneling, plaster and lath (or wire mesh), or any formed finished wall product in a building. Once the junction box is installed in the wallboard, said junction box extends to the interior and to the exterior of that wallboard allowing conduit to be connection both inside and outside of said wallboard. The disclosed invention allows a complete rough-in installation to be finished in a single trip by the electrical contractor and greatly reduces the amount of sealant required for any smoke, fire or acoustical seal resulting in a reduction in installation time that can be as much as 70 percent.

As seen in the prior art, U.S. Pat. No. 8,633,384 B1 demonstrates a telescoping adjustable junction box made to adjust the junction box to be flush with the wall finish after installation of wallboard and finishes, so that a wiring device (e.g., a switch) can be installed therein. The '384 Patent is made for cable or cord installation in the wall cavity only, has no knockouts for conduit entry and is not made to extend past the wall finish. Unlike the '384 Patent, the disclosed invention provides a transition method from in-wall wiring to surface wiring for conduit systems. The disclosed invention is designed to protrude from the wall cavity, permitting connection of conduits located on the surface of the wall to connect with those enclosed within the wall. While a wiring device could, under some circumstances, be installed within the disclosed invention, such as to provide an area to splice wires, the primary purpose is to permit a transition from in-wall wiring to surface wiring which allows for simpler and more cost effective installation.

As further shown by the prior art, U.S. Pat. No. 2,697,535 demonstrates an octagon shaped junction box primarily made for installations in plaster ceilings and designed to provide for conduit entry knockouts spaced in a way to prevent interference between lath channel and conduits entering the junction box. The '535 Patent is designed to mount flush with the finished surface and would primarily be used to support lighting fixtures in a ceiling constructed of lath and plaster.

U.S. Pat. No. 3,701,448 demonstrates a junction box that provides the ability to mount the junction box to corrugated roofing panels. The primary use of the '448 Patent would be for surface mounting only to permit wire splicing or fixture mounting, typically on a ceiling, in which circumstances the positioning of the knockouts reduces the need to bend conduit to enter the junction box.

U.S. Pat. No. 7,165,366 B2 demonstrates a junction box with a shape designed to fit within the corrugations of a roof panel, permitting conduit to be connected without necessitating offsets in the conduit to be bent for surface mounting applications only, typically on a ceiling for wire splicing or fixture mounting. Unlike the '535 Patent, '448 Patent and '366 B2 Patent, the disclosed invention is designed primarily to be used inside walls and provides the ability to transition from in-wall wiring to surface wiring for conduit systems. The knockout placement on the disclosed invention is specifically designed to reduce or eliminate an electrician's need to bend conduit to route it into the disclosed invention.

U.S. Pat. No. 3,724,795 demonstrates a junction box permitting it to be mounted quickly to structural framing members such that the junction box is square to the framing and at a specified depth and therefore flush with the finished wall. Its primary use is the installation of wiring devices to be accessible from a finished wall.

U.S. Pat. No. 6,800,806 B1 demonstrates a junction box designed to enable it to quickly be mounted to the side of a wall stud or floor or ceiling joist where the purpose would be to enable the installation of wiring devices flush with the wall surface. The '806 B1 Patent includes knockouts for conduit and clamps for non-metallic or armor-clad cable permitting a variety of cables and conduits to enter the junction box.

U.S. Pat. No. 7,022,912 B1 demonstrates a junction box that is made for installation in conduit rack systems without the necessity of bending conduit entering the rack system enclosure, the application of which is in the installation of surface mounted or suspended group conduit installation racks where a splice or junction is required.

U.S. Pat. No. 7,554,032 B2 demonstrates a molded electrical junction box with multiple mounting features, the primary purpose of which is to install wiring devices for mounting flush with the wall surface of a finished wall. Unlike the '795 Patent, '806 B1 Patent, '912 B1 Patent, and '032 B2 Patent, the disclosed invention permits an installation which is simpler and more cost effective than the prior art to transition from in-wall wiring to surface wiring for conduit systems and includes side mounting brackets to enable the disclosed invention to be mounted to structural framing members quickly, while maintaining proper alignment depth to other junction boxes in the wall cavity simultaneously with enabling conduit to enter the junction box on the wall surface.

U.S. Pat. No. 5,448,012 demonstrates a method for installing a series of junction boxes with variations of extended depth that permit installation of electrical conduit, in straight sections, between pairs of non-adjacent junction boxes. The primary use of the '012 Patent is installation of wiring devices flush with the wall surface of a finished wall. Unlike the '012 Patent, the disclosed invention is designed to protrude from the wall cavity to permit conduits on the wall surface to be connected with conduits enclosed within the wall, thus providing the ability to transition from in-wall wiring to surface wiring with an installation that is simpler and more cost effective when compared to the prior art.

US 2009/0183891 demonstrates a junction box is a telescoping adjustable box made to adjust the junction box to be flush with the wall finish after installation of wallboard and finishes. This box is made to finish flush with the wall finish, for installation of a wiring device, with no entry provisions outside the wall cavity. Unlike the '012 Patent and 2009.0183891 A1 Patent, the disclosed invention is designed to protrude from the wall cavity to permit conduits on the wall surface to be connected with conduits enclosed within the wall, thus providing the ability to transition from in-wall wiring to surface wiring with an installation that is simpler and more cost effective when compared to the prior art.

U.S. Pat. No. 8,193,444 B2 demonstrates a junction box with a stair stepped back that permits it to be mounted to a framing member or strut to permit conduit to enter the junction box without the need of bending the conduit. The application for the '444 B2 patent is for the installation of wiring devices or splices of wires in surface mounting applications or in applications where wallboard would not be installed over framing members. Unlike the '444 B2 Patent, the disclosed invention permits an installation which is simpler and more cost effective than the prior art to transition from in-wall wiring to surface wiring for conduit systems and includes side mounting brackets to enable the disclosed invention to be mounted to structural framing members quickly, while maintaining proper alignment depth to other junction boxes in the wall cavity simultaneously while enabling conduit to enter the junction box on the wall surface. Additionally, the disclosed invention's full depth provides greater wire capacity and working space.

The prior art in the field does not disclose a junction box which enables transition from an in-wall wiring to surface wiring for conduit systems without the necessity of bending conduit and creating a large wallboard opening at the transition point. The prior art references are either designed to mount flush with the wall surface or do not protrude far enough from the wall surface to accommodate conduit entry on the wall surface. The disclosed invention permits the transition from in-wall wiring to surface wiring in a singular box that is easy to mount, cost effective to use, and reduces or eliminates an electrician's need to bend conduit to enable it to enter the junction box.

Accordingly, a primary object of the disclosed invention is to provide an electrical conduit junction box with a design that extends beyond both sides of the wallboard such that it can be independently supported from the building structure in compliance with the National Electric Code, section 314.23, while facilitating the connection of conduit to the electrical conduit junction box without necessitating the bending or offsetting of such conduit and providing a quick, easy and more efficient means of completing its installation and connection to the building structure and connecting conduit, as well as minimizing the alteration to the wallboard made necessary to properly position the electrical conduit junction box, and thereby reducing the time and material required for sealing gaps in the wallboard surface for fire, smoke or acoustical reasons.

BRIEF SUMMARY OF THE INVENTION

The disclosed invention comprises an electrical conduit junction box having a back plate and a plurality of side walls, defining a front opening. The junction box is designed to be installed within wallboard, and by means in which the junction box passes thru the wallboard. The wallboard might be one of a number of ways to construct a wall, for example said wallboard could constitute drywall, dryvit or stucco, wood paneling, plaster and lath (or plaster and wire mesh), or any formed finished walls in a building. Once the junction box is installed in the wallboard, said junction box extends to the interior and to the exterior of that wallboard allowing conduit to be connection both inside and outside of said wallboard. Side mounted brackets are attached to the plurality of side walls to enable the electrical conduit junction box to be positioned where it can then pass through both sides of the wallboard through which it is installed. The side mounted brackets provide a means of attachment of the junction box to a wood or metal building stud or building framing member to ensure that the electrical conduit junction box is independently supported from the building structure under the requirements of the National Electric Code, section 314.23. If a building stud or building framing member is not available, then side mounted brackets cannot be used, and alternatively mounting holes can be added to the back plate so that the junction box can be attached to commercially available stud spanning brackets. This design further permits conduit to be connected to the disclosed invention on either side of the wallboard through which the electrical conduit junction box passes and specifically permits the routing of conduit between the disclosed invention and another typical junction box without the need for bending or offsetting conduit which can be connected to the disclosed invention through knockouts located in the side walls of the disclosed invention. The knockouts in the side walls of the disclosed invention include conduit entry knockouts, typically ½ and ¾", but up to 1¼" trade size conduit.

The disclosed invention includes a square electrical junction box that enables conduit to be routed in transition from in-wall wiring to out of wall (or surface) wiring in a building. The depth of the junction box allows installation in the wall at a depth that does not require conduit to be bent, and extends through the wallboard allowing installation of surface conduits—also without requiring bending. The invention eliminates the need for bending of conduit and allows for simplified wallboard installation using a rotary cutter to cut the opening for the junction box.

An installation utilizing the invention requires no additional mounting brackets or conduit bends, allows for a one-trip, complete, rough-in installation, and greatly reduces the amount of sealant required for smoke, fire and acoustical seal. In wall installation time can be reduced by as much as 70 percent. The invention is reflected, in isometric view, in FIG. 1 consisting of an exterior box made from code gauge galvanized steel; the depth of the side walls of the junction box are of sufficient depth to allow the junction box to pass through both sides of the wallboard; the construction will allow use of commercially available stud spanning brackets where direct mounting, typically to a building stud or building framing member, is not possible; the junction box extension through the wallboard has knockouts that allow surface conduit to be connected without bending on either or both sides of the junction box offsets, typically said knockouts are fitted with commercially available blank covers or raised device covers; the junction box can be fitted with commercially available blank covers or raised device covers; the junction box typically has a depth of 3⅝", where the distance from the outer edge of the junction box to the exterior of the wall is 1½" (which allows the installation of conduit through the knockouts, accounting for a typical depth of a ⅝" wallboard, and then an additional depth of depth of 3⅝" being the distance from the inside of the junction box to the interior of the wall of 1½" (which allows the installation of conduit within the wall through the knockouts); the maximum practical useful depth of the junction box would be approximately 6¼" where the distance from the outer edge of the junction box to the exterior of the wall is 1½", the depth of double-thickness wallboard being 1¼", and then the internal depth of the junction box limited to 3½" from the inside of the junction box to the interior of the wall; the junction box typically provides conduit entry knockouts, typically ½ and ¾", but up to 1¼" trade size conduit; and, side mounted brackets which allow direct attachment to wood or metal building studs with the electrical conduit junction box extending through the finished wall on both sides.

The width and height of the plurality of side walls of the junction box would typically be 4" by 4" due to the size of the industry standard cover plates or raised device covers. However a minimum practical width and height could be 2" by 4". The maximum practical width and height for typical commercial and residential installations would be 6" by 6", however additional extended dimensions for the width and height could be utilized for atypical applications.

BRIEF DESCRIPTION OF THE DRAWINGS

FIG. 7 is a cross section view of the disclosed invention shown in FIG. 1, installed in a typical application;
FIG. 8 is a cross section view, demonstrative of a typical electrical conduit junction box installation without the disclosed invention;
and
FIG. 9 is a cross section view, demonstrative of a second typical electrical conduit junction box installation without the disclosed invention.

DETAILED DESCRIPTION OF THE INVENTION

Figure 1:
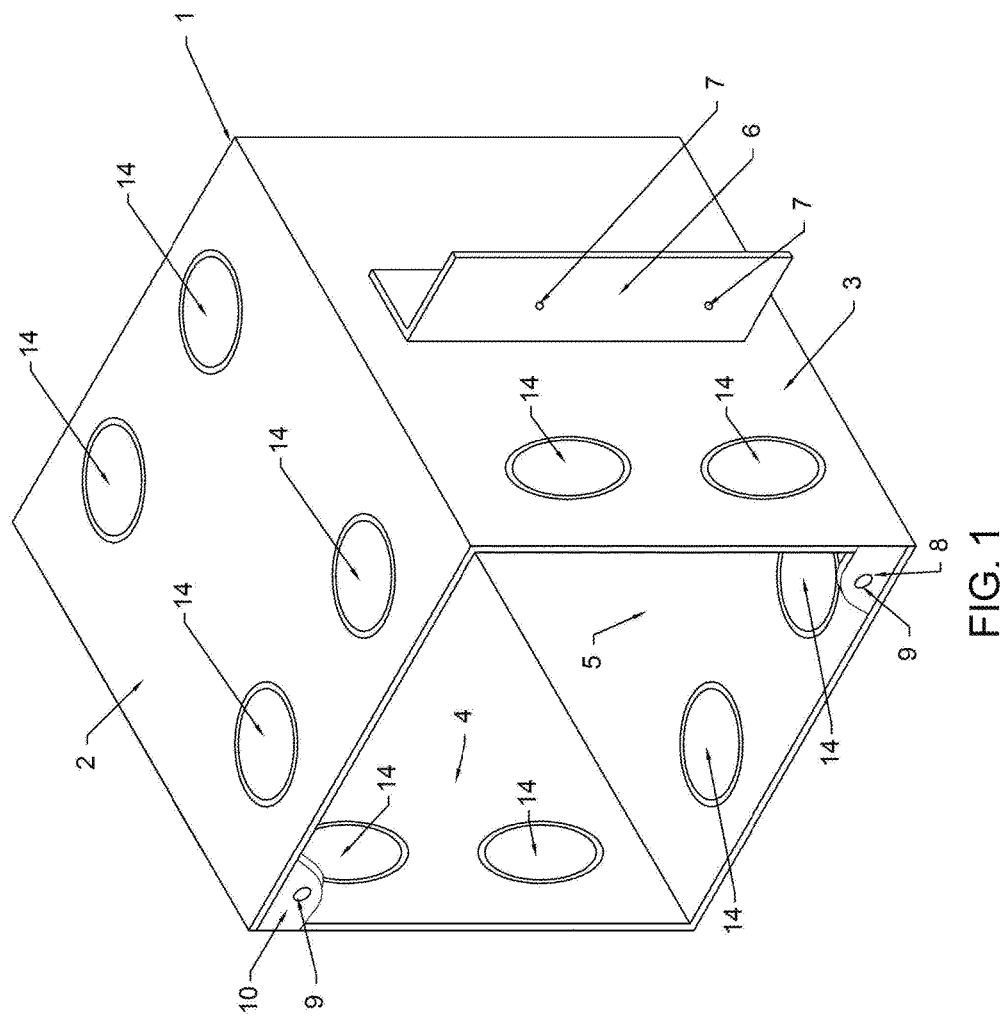
FIG. 1 is an isometric view of the disclosed invention.

In the following description, to the extent possible for clear description, elements that appear in different figures will bear the same reference numerals.

Figure 2:
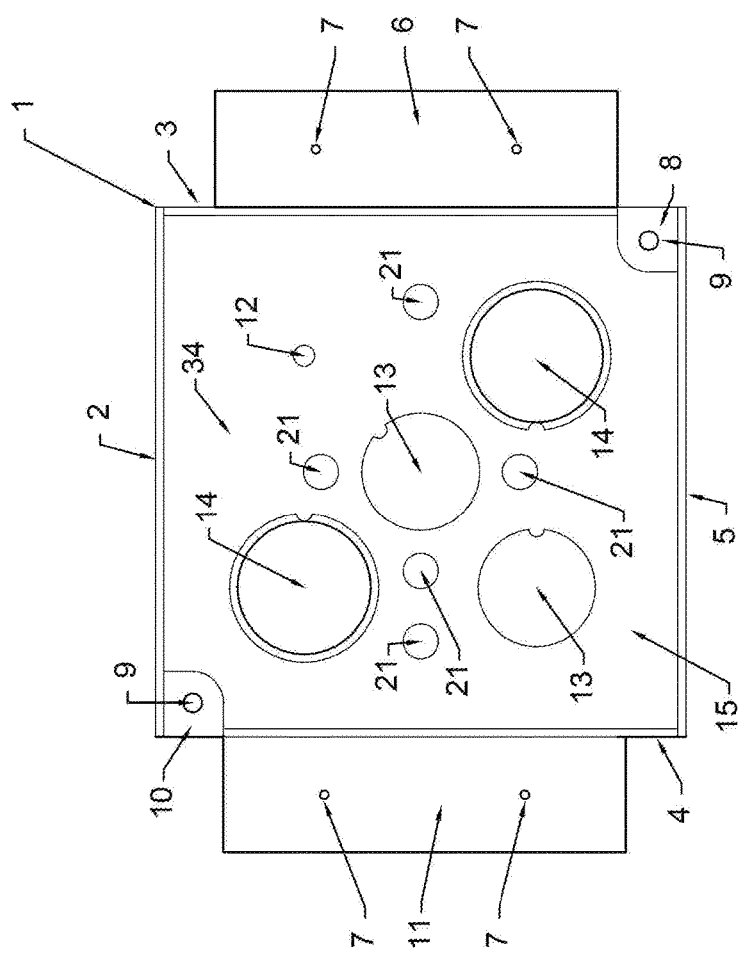
FIG. 2 is a front elevation view of FIG. 1.
Figure 3:
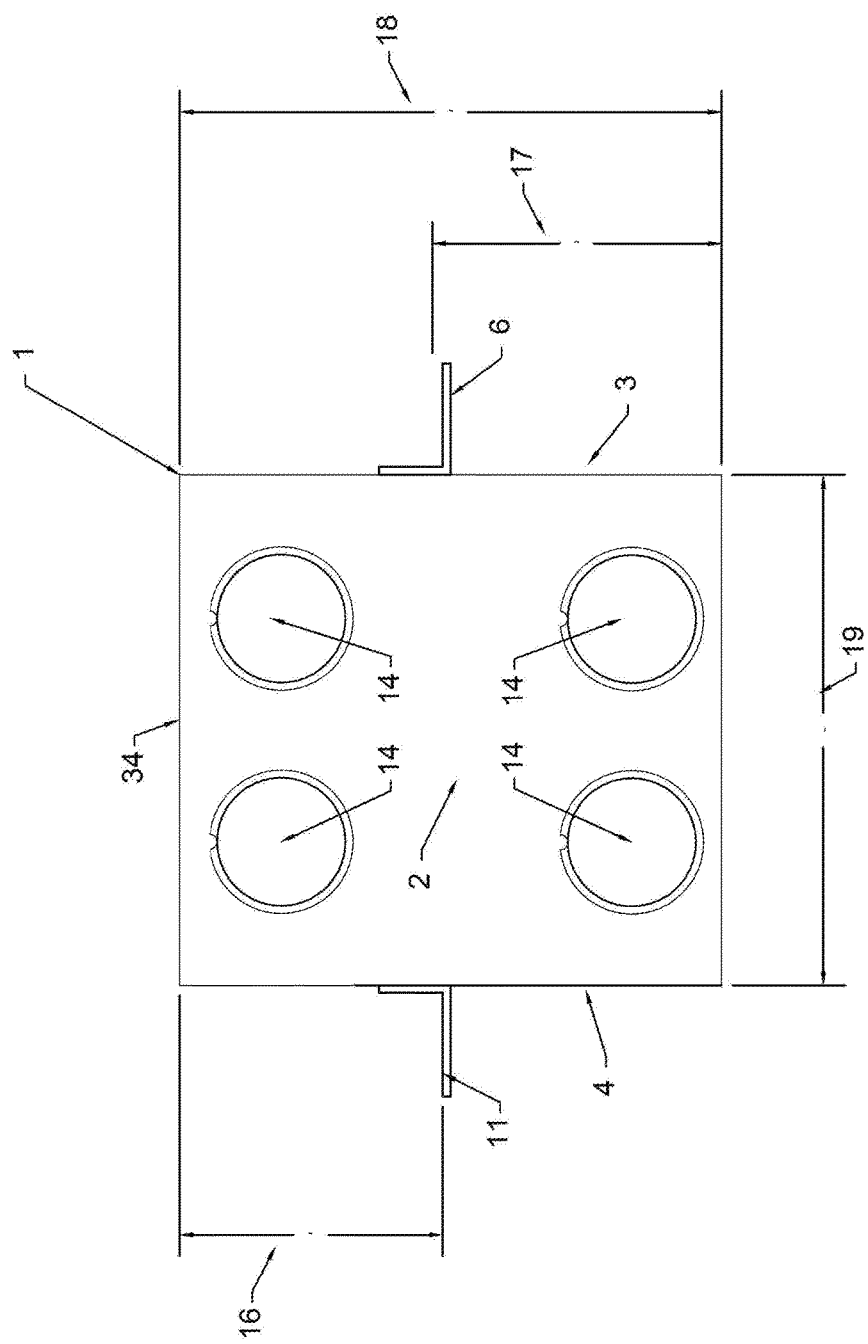
FIG. 3 is a top view of FIG. 1.
Figure 4:
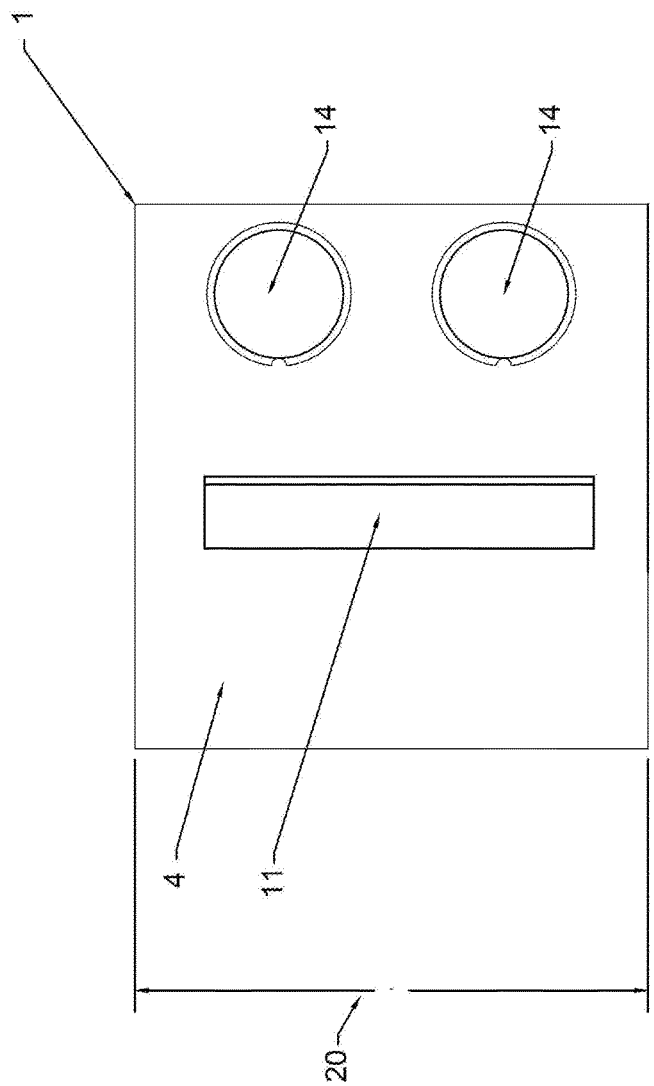
FIG. 4 is a left side view of FIG. 1.
Figure 5:
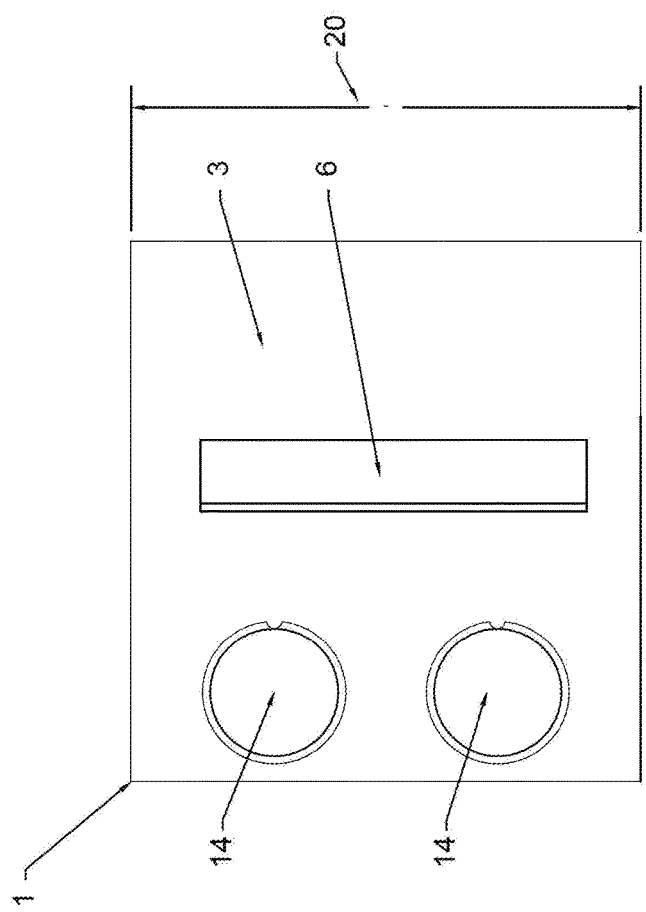
FIG. 5 is a right side view of FIG. 1.
Figure 6:
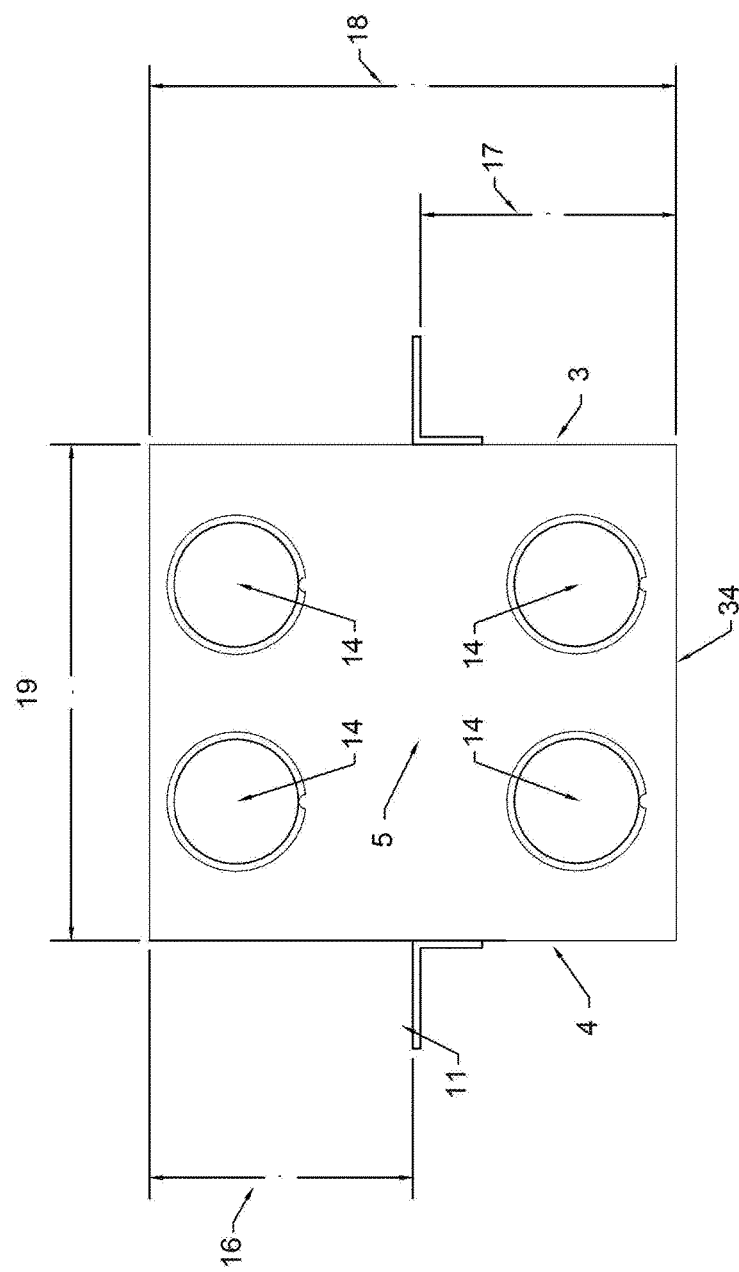
FIG. 6 is a bottom view of FIG. 1.

The proposed invention is illustrated using FIGS. 1-6, wherein a junction box 1 attaches to a building framing member or a framing spanning box support and allows transition from in-wall wiring to surface wiring. Multiple conduits may be connected to the junction box by inserting conduit connectors through knockouts 13, 14. Knockouts 13, 14 can be removed by various methods including hammering and twisting. Conduit connection is made without the need to bend the conduits that attach to the junction box 1. The junction box 1 is constructed of a plurality of side walls 2,3,4,5 connected to the back plate 34. Two side mounting brackets 6, 11 are attached to the vertical side walls 3, 4 of the junction box 1. Screw holes 7 are provided in the mounting brackets 6, 11 allowing attachment to building framing members using screws or nails. These are attached at a specific depth 17 from the front of the junction box 1 so that when installed, the junction box 1 will be at the correct depth to position knockouts 14 located on the side walls 3,4 and horizontal side walls 2,5 in position for conduit to enter without requiring bending. Mounting holes 21 are provided in the back plate of the junction box 34 allowing attachment to framing spanning box supports with screws.

Box 1 in-wall depth 16 allows use of framing spanning box supports to mount box 1 in application where on-framing mounting is not desired or cannot be performed. Overall depth 18 can vary depending on the thickness of the wallboard and the depth of the junction box on the interior and the exterior of the wall. Overall width 19 and height 20 can vary depending on the amount of conduit that is desired to be installed into the junction box. The width 19 and height 20 of the plurality of side walls of the junction box would typically be 4" by 4" due to the size of industry standard cover plates or raised device covers. Two cover mounting plates 8, 10 with threaded openings 9 attach to the front opening of the junction box at the vertical side walls 3, 4, or on the and top and bottom of the plurality of side walls 2, 5; so that commercially available cover plates or raised device covers can be attached to the front opening of the junction box. A hole tapped for grounding screw attachment 12 is provided on the back plate 34.

The junction box 1 may be constructed from steel and may be cut from a single piece of material with the side walls 2,3,4,5, and back plate 34, folded to shape and connected together by welding or other method. Alternatively, the junction box 1 may be created using multiple pieces of material with the parts connected together by welding or other method. The junction box 1 could be constructed of non-metallic construction using a molding process to shape the junction box 1.

FIG. 7 illustrates an application using the junction box 1. In this example, a switch or receptacle is to be mounted in the wall of a structure behind the wallboard. A box with a plaster ring 22 is mounted to the framing member 31. A conduit connector 23 is inserted and conduit 24 is installed to a point above the ceiling 28 where a connector 23 is installed and the junction box 1 is attached. Construction continues and wallboard 32 is installed. The wallboard installer cuts an opening for the junction box 1 and an opening for the plaster ring 22. The opening for the junction box 1 may be cut with a very close tolerance allowing the wallboard to fit tightly around the junction box 1 thus reducing the amount of sealant required for smoke, fire, and acoustical seal. After the wallboard installation, the electrician can install conduit to other devices in the electrical system on the surface of the wallboard and install a cover 25 on the junction box 1.

We claim:

1. An universal surface flush junction box made to be installed in a wallboard, the junction box assembly comprising:
    a back plate, a top wall, a bottom wall, a plaster ring, a cover, a frame member and a plurality of side walls defining a front opening, wherein the perpendicular depth of said side walls measured from the front opening to the back plate is sufficient to allow the junction box to extend beyond both sides of the wallboard through which it passes;
    mounting holes provided in the back plate of the junction box to allow the junction box to be attached to a stud spanning bracket;
    a plurality of side mounted brackets attached to two of said plurality of side walls and the side mounted brackets provide a means of attaching the junction box to a wood or metal building stud or building the frame member to ensure that the electrical junction box is independently supported from the building structure under the requirement of the National Electric Code;
    wherein said back plate and the front opening extend beyond both sides of the wallboard through;
    a cut in said wallboard to a very close tolerance allow the junction box to pass through said wallboard to fit tightly around the junction box to reduce the amount of sealant required for smoke, fire and acoustical seal;
    said plaster ring attached to the cover and the cover, the plaster ring attached to the box;
    one of plurality of conduit connectors installed on the top wall or the bottom wall of the junction box to connect a conduit in a fashion that allows the absence of bending offsets in said conduit;
    said plurality of conduits connected to the junction box in the interior of the wallboard and the exterior of the wallboard; and
    means to electrically connect the junction box to one or more electrical boxes which may then allow the mounting of additional electrical devices such as a switch or a receptacle; the junction box assembly provide minimizing the alternation to the building structure as well as minimizing the alternation to the wallboard, and reducing the time and material required for sealing a gaps in the wallboard surface for fire, smoke or acoustical reasons.

2. The universal surface flush junction box as set forth in claim 1 wherein the depth of the plurality of side walls measured from the front opening to the back plate is in excess of 3⅝".

3. The universal surface flush junction box as set forth in claim 2 wherein the depth of the plurality of side walls measured from the front opening to the back plate is in excess of 3⅝" but less than 6¼".

4. The universal surface flush junction box as set forth in claim 1 wherein the means to allow conduit to be connected to said junction box without bending offsets are knockouts in the side walls of said junction box.

5. The universal surface flush junction box as set forth in claim 4 wherein the knockouts in the side walls of said junction box include conduit entry knockouts for typically ½ and ¾" but up to 1¼" trade size conduit.

6. The universal surface flush junction box as set forth in claim 1, comprising the additional element of two cover mounting plates attached to the front opening of the junction box located at the top and bottom of the plurality of side walls, said cover mounting plates having threaded openings to attach commercially available cover plates or raised device covers.

7. The universal surface flush junction box as set forth in claim 1 wherein the width and height of the plurality of side walls of the junction box would be, at a minimum 2" by 4", but no greater than 6" by 6".

* * * * *